Figure 4:
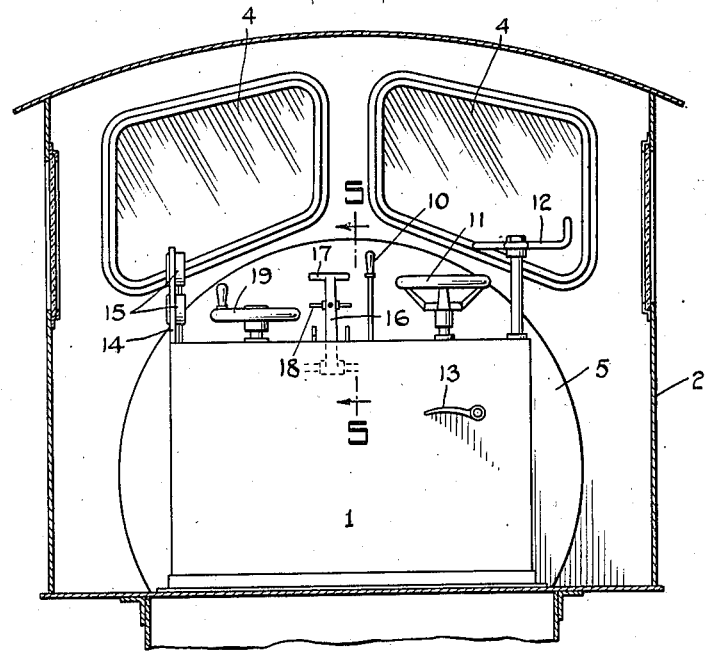

Feb. 9, 1943. P. GILLI 2,310,778
CAB FOR FIRELESS LOCOMOTIVES
Filed July 6, 1940 2 Sheets-Sheet 1
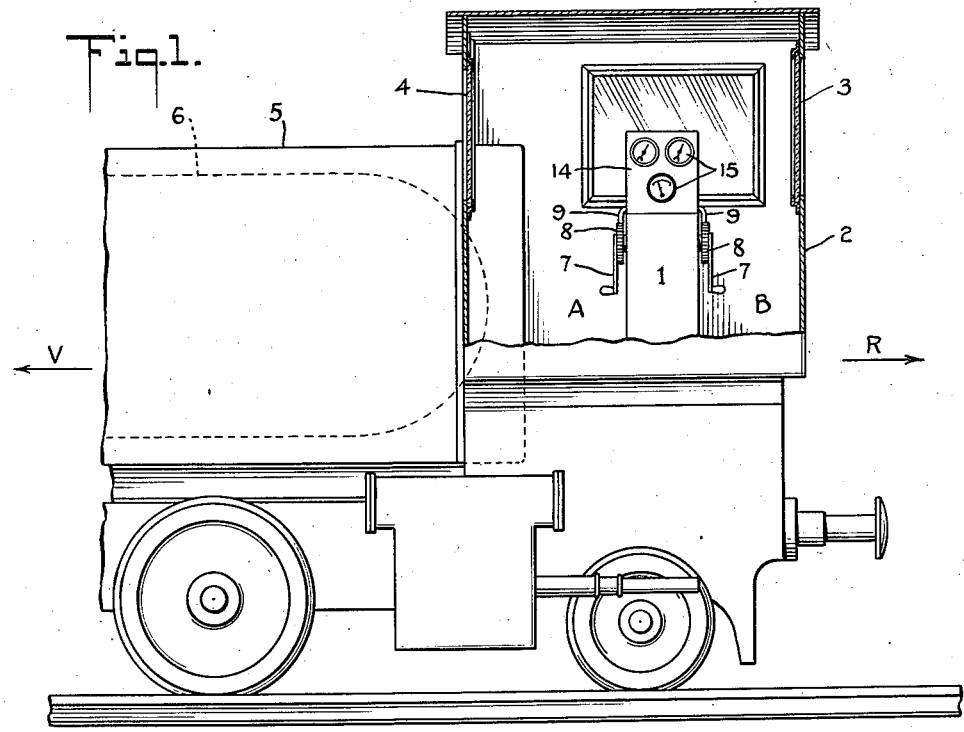
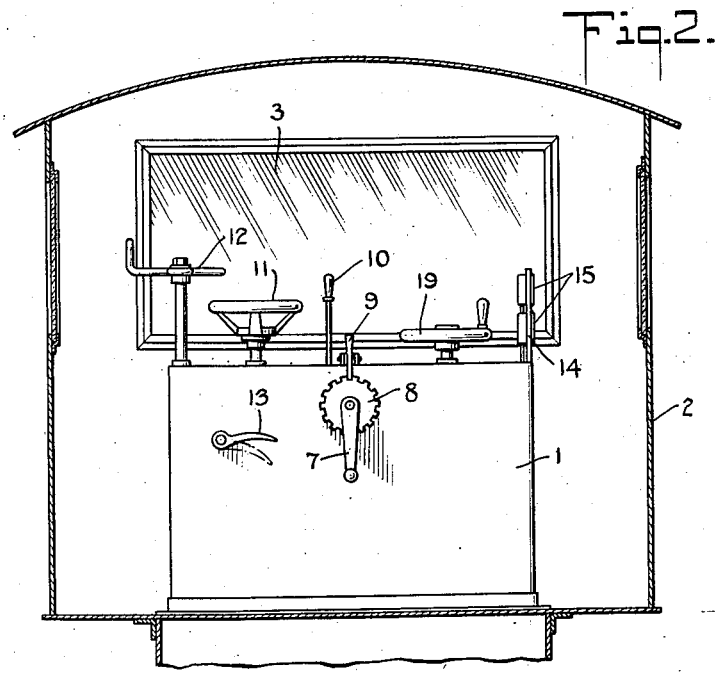
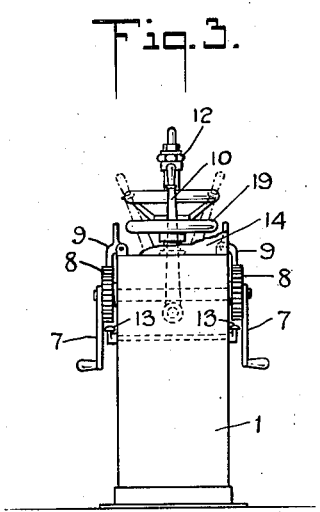
INVENTOR
Paul Gilli
BY
Jarvis C. Markle
ATTORNEY Feb. 9, 1943. P. GILLI 2,310,778
CAB FOR FIRELESS LOCOMOTIVES
Filed July 6, 1940 2 Sheets-Sheet 2

INVENTOR
Paul Gilli
BY
ATTORNEY

Patented Feb. 9, 1943

2,310,778

UNITED STATES PATENT OFFICE 2,310,778

CAB FOR FIRELESS LOCOMOTIVES

Paul Gilli, Vienna, Germany; vested in the Alien Property Custodian

Application July 6, 1940, Serial No. 344,288
In Germany July 21, 1939

2 Claims. (Cl. 105—48)

The invention relates to fireless locomotives (steam accumulating locomotives) with high accumulating pressure and has for its object to arrange the cab in such locomotives in a manner particularly suitable for the attendance thereof.

One of the chief advantages of fireless locomotives is their simple attendance. As all work which the fireman has to carry out on heated locomotives is omitted one man is sufficient for the attendance of a fireless locomotive.

By increasing the accumulating pressure the efficiency of fireless locomotives can be increased many times in comparison with the efficiency of locomotives of known construction. For such locomotives working ranges are thus opened, for which the low pressure-accumulating locomotives of known type can never be considered owing to their low capacity, such as for instance heavy and heaviest shunting work and leading-in work of the State Railway for large industrial plants and smelting works.

If also for this heavy work one-man attendance has to be preserved, special arrangements have to be made to provide for the driver the necessary vision in both directions of travel. On accumulating locomotives with low accumulating pressure the control elements formerly used on fired engines will not be satisfactory.

According to the invention the intended object is attained thereby that all regulating and adjusting devices which are important and have to be manipulated during the travel are arranged on a table mounted in the middle of the cab so that they can be handled from both sides of the table. The driver is in such position that he looks in the direction of travel and is behind the table. According to the invention the devices important for the travel are constructed and arranged so that to a displacement of these devices in a certain direction always corresponds the same effect upon the locomotive in the direction of view immaterial whether the driver is standing on the one or on the other side of the driver's table. If, for instance, a turning of the reversing crank in clockwise direction corresponds to "forward running" such turning of the crank in clockwise direction must effect forward running in the direction of view on both sides of the driver's table. This is valid for all control elements which for forward running and backward running must carry out different movements, for instance movements in opposite directions, such as for instance for reversing, for sanding and the like.

For the arrangements which as such are independent on the direction of travel of the locomotive, such as regulator, brake, cylinder cocks and so forth, the same movement on both sides of the cab must cause the same effect, for instance opening of the regulator or applying of the brake. As these arrangements are actuated independently on the direction of travel, they may be carried out preferably as vertical spindles with hand wheels, spoke wheels or levers on the top end, whereby the desired effect, i. e., similar direction of rotation for both directions of travel, is obtained.

Embodiments of a cab according to the invention are illustrated in Figs. 1 to 5 of the accompanying drawings, Fig. 1 showing the arrangement of the driver's table in the cab of the locomotive whereas Figs. 2 to 5 illustrate the arrangement and construction of the individual arrangements on the driver's table.

The driver's table is designated by 1. It is arranged in the middle of the cab 2 transversely to the longitudinal axis of the locomotive. The driver has free sight in forward and backward direction through the windows or apertures 3 and 4 in the front and rear wall respectively of the cab. The accumulating drum 6 is insulated and enclosed by a planking 5. The arrow V indicates the direction of the forward running, the arrow R the direction of the backward running. The engine driver's stand at backward running is at the point designated by A and at the forward running at the point designated by B, so that he can actually freely observe through the window 3 or 4 respectively in the direction of travel and has the driver's table before him.

Figs. 2 and 3 show by way of example the arrangement and construction of the hand levers and the like on the driver's table. Fig. 2 shows the driver's table viewed from the place A the window 3 being in front of the driver at backward running.

In this instance the reversing is actuated by the crank 7 which in known manner is equipped with a ratchet wheel 8. By means of this wheel 8 and of a pawl 9 the reversing mechanism can be locked in the desired position.

As shown in Fig. 3 one crank 7 is arranged on each side of the driver's table and on a common shaft. Rotating of the crank in clockwise direction effects oscillation of the control in the direction of view, i. e., on side A of the driver's table for backward running and on side B for forward running. The movement of the reversing is transmitted according to the invention on a pointer horizontally movable on the surface of the driver's table, this pointer permitting to read the adjusted charge from both sides of the cab.

The lever 10 for sanding is actuated in the same sense so that a movement of lever 10 from the vertical median position for the corresponding direction of running effects the sanding, that is when moved backwards for the backward running and when moved forward for the forward running.

The regulator in the example illustrated is actuated by means of a hand-wheel 11 mounted on a vertical shaft. From this shaft the movement is transmitted in any suitable manner to the regulator. The regulator is closed when the hand-wheel is turned in clockwise direction, this turning direction beng the same for both places A and B at which the driver can stand. Also the hand-wheel 19 for the compressed air brake and the lever 12 for the hand-brake start the braking when turned in clockwise direction from both sides of the driver's table.

The lever 13 for actuating the cylinder cocks is turnable about a horizontal axle, two such levers 13 being arranged one at each side of the driver's table 1 and on a common shaft. The cylinder cocks are opened independently on the place on which the driver actually stands by depressing the lever 13 from the horizontal position. In Fig. 3, the devices 11 to 13 and 19 are omitted for clearness sake.

On a small switch board 14, fixed at the side of the driver's table 1, the manometers, material for the service, for instance for the accumulating pressure, pressure in the slide valve chest, air pressure for the brake, are arranged and also other measuring instruments, so that they can be well observed during the travel from both sides of the cab.

Figure 5:
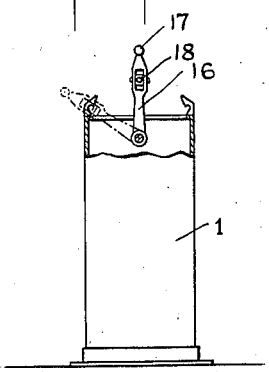

In Figs. 4 and 5 another arrangement of a driver's table according to the invention is shown, in which the reversing is not actuated by a crank but by a lever. This form of construction simplifies the attendance of the locomotive and is particularly suitable for such locomotives in which the adjusting forces for the reversing are not too high.

Fig. 4 shows in elevation the driver's table 1 viewed from place B, so that the driver can freely look forward in the direction of travel through the two windows 4. Fig. 5 shows the corresponding cross-section.

The reversing is effected in this form of construction by a lever 16 turnable about a horizontal axle, said lever having a preferably transverse handle 17. In known manner a locking arrangement is connected with the hand lever 16 and acts, through the intermediary of a counter lever 18, upon a locking pin and locks the reversing gear when the handle 17 and thereby the lever 18 are released. According to the invention a movement of the reversing lever from the vertical middle position, which corresponds to the middle position of the control gear, determines the oscillation of the control gear in the same direction, that is at a movement of the control lever in the direction of view the travelling direction is also in the direction of view. Oscillation of the control lever in the direction of the arrow V (Fig. 1) means therefore forward running, the oscillation in the direction R means backward running.

The arrangement of the other actuating elements corresponds to Fig. 3 and similar reference numerals are used.

The forms of construction of the operative elements on the driver's table as shown in the several figures are very handy and easy to observe but some of these arrangements can be carried out in a different manner.

It is for instance possible to construct the adjusting device for the regulator as a lever instead of as a hand wheel, said lever being moved from above downwards, which corresponds to the same movement on both sides of the driver's table. The device may also be constructed, similar as part 16 in Fig. 4, as a lever with horizontal axle, the regulator being closed when the lever is in the median position and being opened when the lever is moved in either direction this being easily attained by a bell crank lever. The actuation of other arrangements may be modified in a similar manner.

The invention may be further combined with other arrangements, for instance a Totmann-arrangement, so that in accordance with the actual place of the driver, at A or B, the reversing is possible only for the direction of travel corresponding to the direction of view.

The construction of the cab according to the present invention may be employed with advantage on other vehicles, for instance on fire heated locomotives or on motor locomotives.

I claim:

1. In a locomotive, a cab having windows at opposite ends thereof for vision in both directions of movement of the locomotive, a table located centrally of the cab between the windows and extending parallel thereto for dividing the cab into forward and reverse operating compartments, and a single set of control members for both forward and reverse movements of the locomotive supported by the table in position for equal accessibility from both compartments, said control members being constructed and mounted for movement in the same direction from the respective compartments for controlling both forward and reverse movements of the locomotive.

2. The structure recited in claim 1 in which said control members include a horizontally mounted shaft extending across said table in a direction parallel to the direction of movement of the locomotive and rotatable in its mounting to control the reversing of the locomotive, and operating means on each end of said shaft whereby rotation of said operating means in a clock-wise direction with regard to the position of the engineer facing the respective means has the same effect on the operation of the locomotive with respect to the direction of the engineer's view.

PAUL GILLI.